United States Patent [19]

Snyder

[11] 4,451,063

[45] May 29, 1984

[54] RUNNING BOARD CONSTRUCTION

[75] Inventor: Steven A. Snyder, Constantine, Mich.

[73] Assignee: Coachmen Industries, Inc., Middlebury, Ind.

[21] Appl. No.: 386,755

[22] Filed: Jun. 9, 1982

Related U.S. Application Data

[63] Continuation-in-part of Ser. No. 348,507, Feb. 12, 1982.

[51] Int. Cl.³ .............................................. B60R 3/00
[52] U.S. Cl. .................................... 280/163; 52/188; 182/92; 403/386
[58] Field of Search ............... 280/163, 164 R, 164 A, 280/169; 182/90, 92; 52/182, 191, 188; 248/250; 403/386, 387, 400; 312/195, 258 SK; 296/62

[56] References Cited

U.S. PATENT DOCUMENTS

| | | | |
|---|---|---|---|
| 1,157,827 | 10/1915 | Wardwell | 403/387 X |
| 2,077,822 | 4/1937 | Baker | 250/33 |
| 2,767,951 | 10/1956 | Cousino | 403/387 X |
| 2,833,608 | 5/1958 | Tobias | 311/17 |
| 3,774,952 | 11/1973 | Zorn | 52/188 X |
| 4,203,611 | 5/1980 | Makela | 280/163 |
| 4,257,620 | 3/1981 | Okland | 280/153 R |
| 4,311,320 | 1/1982 | Waters, Jr. | 280/169 X |

OTHER PUBLICATIONS

SX-11 *Super Stepguard Running Boards*, Kenco Engineering.

*Primary Examiner*—Joseph F. Peters, Jr.
*Assistant Examiner*—Michael Mar
*Attorney, Agent, or Firm*—Lockwood, Dewey, Alex & Cummings

[57] ABSTRACT

An improved running board construction for mounting to a vehicle includes an elongate deck and at least one bracket extending beneath and transverse to the deck, the bracket being attachable to the frame of the vehicle for mounting the running board to the vehicle. A single channel is formed integrally with the underside of the deck. The channel includes a pair of walls which are spaced transversely from each other and a pair of inwardly turned lips on the walls extending toward each other. A plate which also extends transversely of the deck is slidably received in the channel and bolts having flat sided heads extend downwardly from the slidable plate for attaching the plate to the bracket. The flat sided heads of the bolts are positioned against at least one of either the walls of the channel or against a raised bead on the plate to prevent the bolts from turning.

19 Claims, 6 Drawing Figures

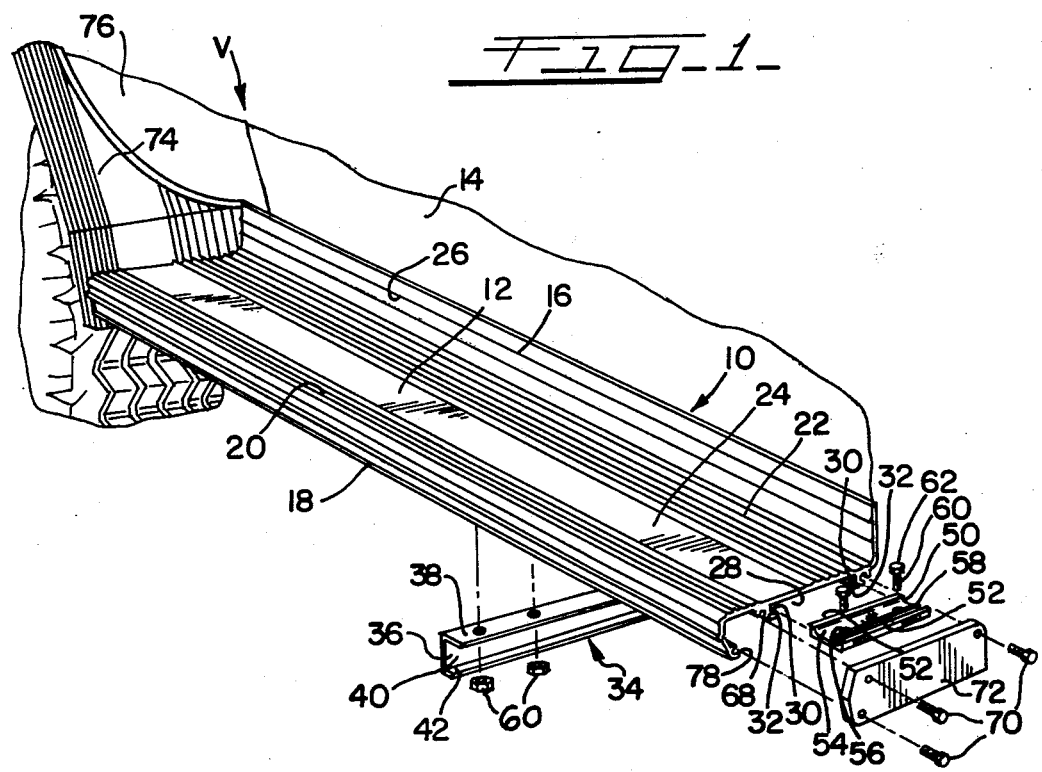
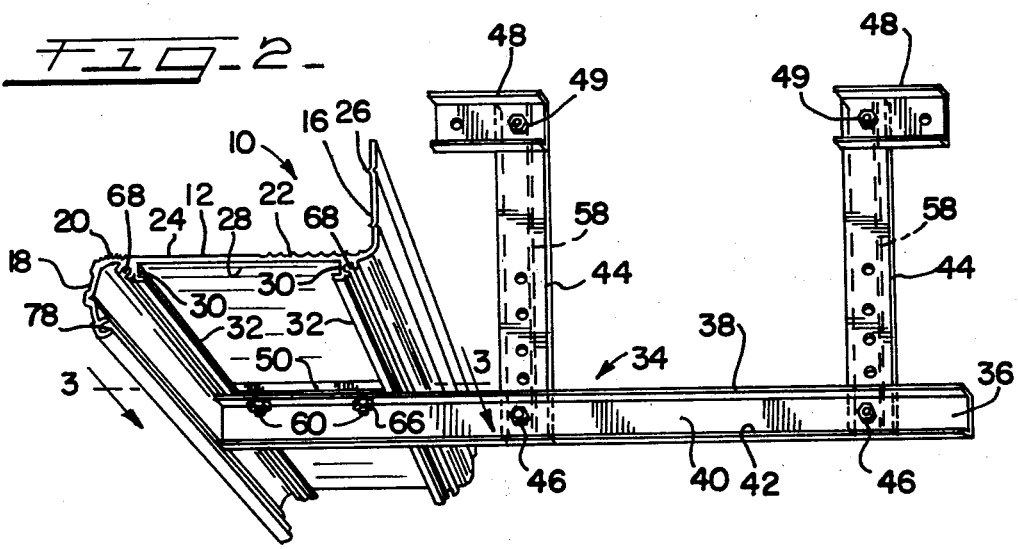

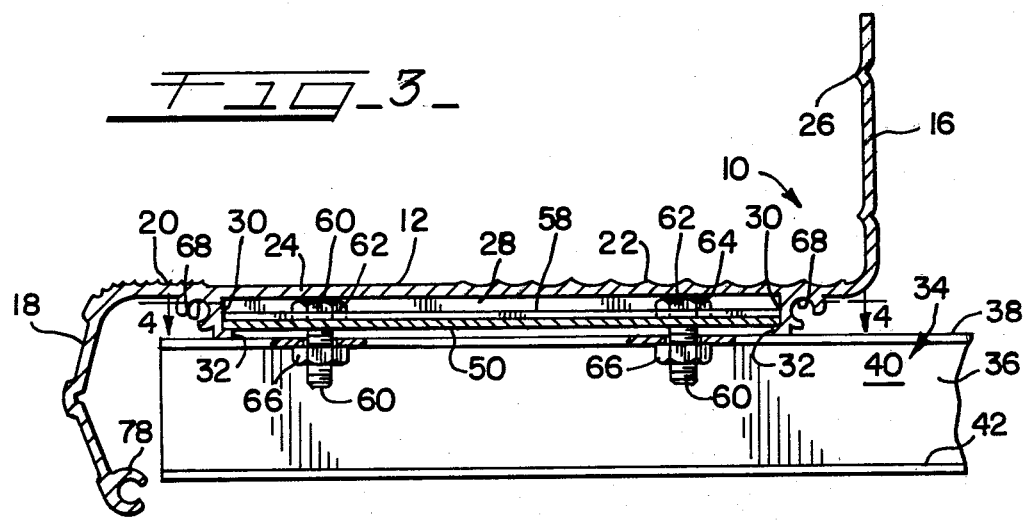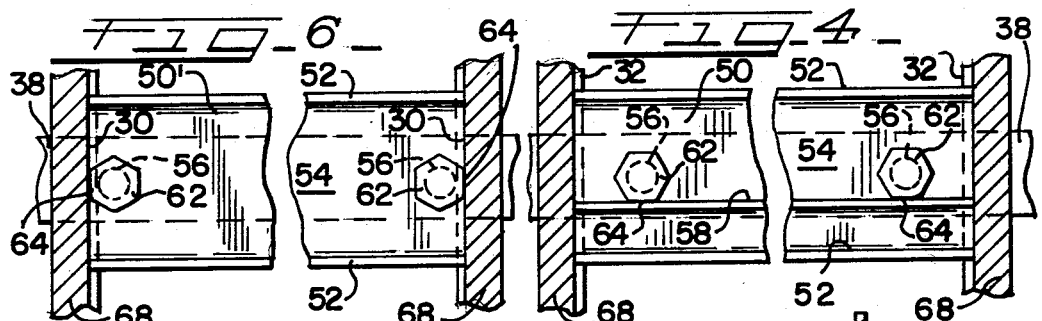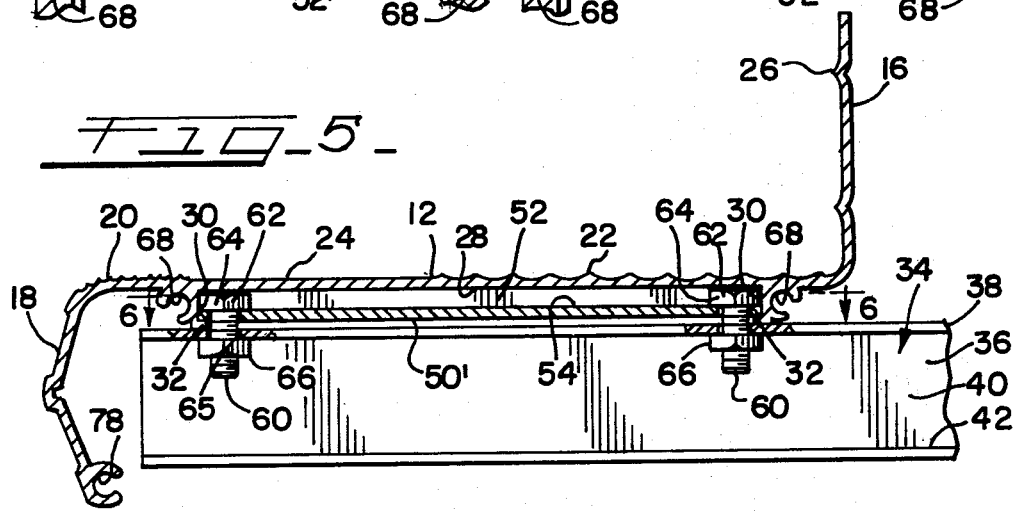

RUNNING BOARD CONSTRUCTION

RELATED APPLICATION

This application is a continuation-in-part of copending application Ser. No. 348,507, filed Feb. 12, 1982.

BACKGROUND AND SUMMARY OF THE INVENTION

The present invention relates to an improved running board construction for mounting to a vehicle and, more particularly, to an improved fastening construction for mounting the running board.

The running board construction disclosed in my copending application Ser. No. 348,507, filed Feb. 12, 1982, in which I was a coinventor with Gary L. Reeve, discloses a running board construction including fastener means which utilizes only a single channel and spaced parallel flanges formed integrally with the underside of the deck of the running board and a transversely extending bracket for attaching the running board deck to the vehicle wherein the bracket is bowed between the flanges when the bracket is fastened to the channel. This single channel construction overcame several disadvantages of the prior art, plural channel running board mounting constructions and also enjoyed several additional advantages over such prior art constructions. The running board construction disclosed in that copending application realized a reduction in weight, utilized fewer materials and components, and simplified the speed and ease of assembly over the constructions of the prior art. That construction also realized additional support and strengthening of the running board deck over the prior art constructions and certain portions of the structure disclosed in that copending application were capable of serving the dual function of providing for fastening of the ends of the running board deck, as well as the mounting of the deck to the vehicle.

The improved running board construction of the present invention not only overcomes the disadvantages experienced by the prior multiple channel constructions and which were solved by the construction disclosed in the aforementioned copending application, but also realizes the several additional advantages realized in the last mentioned construction. Moreover, these advantages are actually enhanced and improved in the running board construction incorporating the principles of the present invention.

In the improved running board construction incorporating the principles of the present invention, the strength of the construction is greatly improved because the forces encountered during use are more widely distributed than in either the prior multiple channel constructons or the construction disclosed in my copending application. Wider distribution of forces is realized due to a multiple point deck mounting in the present invention and increased support over a large support area of the bolt heads themselves. Such increased strength and improved support eliminates the possibility of tearing of the channel lips by the bolt heads. In a running board construction incorporating the principles of the present invention, improved strength is also realized by virtue of the channel lips being clamped between two elements of substantial area. In a running board construction incorporating the principles of the present invention, a substantial reduction is realized both in the amount of materials and in the number of components, thus resulting in a decrease in the weight and cost of materials. In a running board construction incorporating the principles of the present invention, the speed and ease of assembly is greatly increased and the stock employed to form certain of the components of the construction may also be employed to form other components of the construction, thus reducing raw material inventory requirements In one principal aspect of the present invention, a running board construction for mounting on a vehicle includes an elongate deck and mounting means for horizontally mounting the deck to the vehicle. The mounting means includes at least one elongate bracket means for extending beneath and substantially transverse to the deck and the bracket means is attachable to the frame of the vehicle. Fastener means for fastening the elongate bracket means to the underside of the deck is also provided. The improvement in the fastener means comprises a channel mounted on the underside of the deck, the channel including a pair of walls spaced transversely from and parallel to each other and extending downwardly from the underside of the deck, and a pair of inward turned lips on the walls extending toward each other. A plate of substantial width in a direction transverse of the deck and extending between the walls transversely of the deck is slidably supported upon the lips and is positioned in the channel, and stud means extend downwardly from the slidable plate for attaching the plate to the bracket means.

In another principal aspect of the present invention, the stud means comprises a pair of bolts which extend through openings in the aforementioned plate, and flat sides on the heads of each of the bolts are positioned against at least one of either the walls of the channel or a raised bead on the plate to prevent turning of the bolts.

These and other objects, features, and advantages of the present invention will be clearly understood through a consideration of the following detailed description.

BRIEF DESCRIPTION OF THE DRAWINGS

In the course of this description, reference will frequently be made to the attached drawings in which:

FIG. 1 is an overall perspective view showing one preferred embodiment of running board construction in accordance with the principles of the present invention and in which parts have been exploded for a clear understanding of the running board construction;

FIG. 2 is a partially broken perspective view of the running board construction shown in FIG. 1, but as viewed from beneath and showing the bracket for attachment of the running board construction to the frame of the vehicle;

FIG. 3 is an enlarged, partially broken, cross-sectioned, end elevational view of the running board construction as viewed substantially along line 3—3 of FIG. 2;

FIG. 4 is a broken, cross-sectioned plan view of the construction as viewed substantially along line 4—4 of FIG. 3;

FIG. 5 is an enlarged, partially broken, cross-sectioned, end elevational view of a second preferred embodiment of running board construction of the present invention; and FIG. 6 is a broken, cross-sectioned plan view of the second preferred embodiment of running board construction as viewed substantially along line 6—6 of FIG. 5.

DESCRIPTION OF THE PREFERRED EMBODIMENTS

A first preferred embodiment of running board construction 10 is shown in FIGS. 1-4 and an overall perspective view of this embodiment is shown in FIGS. 1 and 2. The construction 10 generally comprises an elongate running board deck 12 which preferably extends over substantially the length of the cab door 14 of the vehicle V to which the running board is to be mounted. A kickplate 16 extends vertically from the inner vehicle side of the deck 12 and covers any gap which may exist between the deck and the vehicle body. The kickplate 16 is preferably formed integrally with the deck 12, such as by extruding the plate with the deck. To complete the general construction of the running board, a downturned outer flange 18 extends along the length of the deck. The outer flange 18 is also preferably formed integrally with the deck 12, such as by extrusion with the deck, and has both a decorative as well as a strengthening function for the deck 12. The deck 12, kickplate 16 and outer flange 18 may be formed of any suitable material, such as aluminum.

The top side of the deck 12 preferably includes a plurality of longitudinally extending ridges 20 extending along its front edge as shown in FIGS. 1-3. The ridges 20 are not only decorative, but also function to define a non-skid surface and act as squeegees to remove moisture and foreign matter from the shoes of the vehicle passengers. A plurality of additional ridges 22, also as shown in FIGS. 1-3, are also preferably formed along the top of the inner or vehicle side of the deck. These ridges also define decorative and non-skid surfaces. A flat portion 24 preferably extends longitudinally of the deck between the ridges 20 and 22 for receiving an abrasive, non-skid tape (not shown).

As previously mentioned, the kickplate 16 is preferably formed integrally with the deck 12, for example by extrusion with the deck. Such integral attachment of the kickplate 16 to the deck 12 not only improves the strength of the deck, but also eliminates the need to mount the kickplate to the deck during assembly, thus facilitating the speed and ease of assembly. The kickplate 16 may also include one or more ridges 26 extending longitudinally of the kickplate which not only have a decorative function, but also further improve the strength and rigidity of the kickplate.

A single elongate channel 28 of substantial width extends longitudinally over the length of the deck on the underside of the deck 12. As shown in FIGS. 1-3, the channel 28 comprises a pair of downwardly extending walls 30 which are spaced from each other transversely of the deck and which terminate in inwardly turned lips 32 over the length of the channel. The walls 30 are transversely spaced apart by a substantial distance and are preferably nearer the elongate side edges of the deck 12 than they are to the center to maximize the area of support of the deck. The walls 30 and lips 32 are also preferably formed integrally with each other and with the underside of the deck, such as by extrusion with the deck.

An elongate mounting bracket 34 includes an elongate frame arm 36 having an upper flange 38, a vertical web portion 40 and a lower flange 42. The flanges 38 and 42 strengthen the frame arm 36 and the upper flange 38 also provides a point of attachment to the running board as will be explained in further detail to follow. One or more frame mounting arms 44 are bolted by bolts 46 or other suitable fasteners to the web 40 of the frame arm 36 and extend upwardly where their upper ends are attached to the frame 48 of the vehicle by bolts 49 as shown in FIG. 2.

The components of the mounting bracket 34 are preferably formed of aluminum, but may be formed of any material which has sufficient strength to support the running board and the loads which may be applied thereto in use. Although a single mounting bracket 34 is shown in FIG. 2, it will be understood that more than one such bracket may be used as necessary.

A flat plate 50, having a length in a direction transverse of the deck 12 which is approximately equal to the substantial transverse distance between the walls 30, is slidably received in the channel 28 defined by the walls 30. Plate 50 is itself preferably formed of channel material having a pair of low upstanding flanges 52 along its marginal elongate edges as shown in FIGS. 1 and 3. Thus, the plate 50, as formed by its upstanding marginal flanges 52 and flat web 54 extending between the flanges, is generally U-shaped in cross-section. The flanges 52 strengthen the plate while allowing the utilization of the minimum amount of material in the plate and they provide an upwardly facing channel for receiving the heads of the fastening bolts as will now be described.

The plate 50 also includes a pair of openings 56 which are spaced from each other across the transverse width of the plate, as best shown in FIG. 4. A raised bead or flange 58 is also preferably formed on the upper face of the web 54 of plate 50. The bead 58 extends longitudinally over the length of the plate adjacent to, but slightly spaced from the openings 56. A pair of bolts 60 are positioned to extend downwardly through the openings 56. The bolts have heads 62 with one or more flat sides 64, such as the hexagonal headed bolts shown in FIG. 4. The raised bead 58 is positioned relative to the openings 56 such that when the bolts are inserted through the openings, one of the flat sides 64 of each of the bolt heads 62 is positioned against the bead to prevent the bolts from turning during tightening. The bolts extend downwardly through aligned openings 65 in the upper flange 38 of the frame arm 36 as shown in FIG. 3. Tightening is accomplished by nuts 66 threaded onto the ends of the bolts 60 which project beneath the frame arm upper flange 38 as shown in FIGS. 2 and 3.

The bead 58 shown in the embodiment in FIGS. 1-4 not only increases the strength of the plate 50, but also has the advantage that the openings 56 may be placed at any location along the width of the plate 50, rather than being confined to the ends of the plate. However, the openings 56 are preferably placed at a position closer to the ends of the plate than to the center to increase the fastening strength of the assembly by clamping the lips 32 between the bottom side of plate 50 and the top side of flange 38 of frame arm 36 closely adjacent the bolts.

An additional smaller pair of channel-shaped beads 68 also preferably extend longitudinally along the outer sides of the walls 30 over the length of the deck. These channel-shaped beads 68 are also preferably formed integrally with the walls 30 and the underside of the deck, such as by extrusion. These additional channel-shaped beads 68 act to further reinforce the deck 12 and the walls 30 and also provide sites at their ends for receiving self-tapping screws 70 which may be threaded into the ends of the channel-shaped beads 68 for attachment either of an end cap plate 72 or of a stone guard plate 74, the latter of which is attached to the fender 76 of the vehicle V as shown in FIG. 1. An additional channel-shaped bead 78 preferably extends longitudinally along the lower edge of the outer flange 18 for the same purposes.

The embodiment shown in FIGS. 5 and 6 is substantially identical to the embodiment thus far described as shown in FIGS. 1-4. Accordingly, like reference numerals have been employed to designate like elements and components.

The only difference between the embodiment shown in FIGS. 5 and 6 and that shown in FIGS. 1-4 is that the raised bead or flange 58 has been eliminated and the openings 56 through the plate 50' as shown in FIGS. 5 and 6 have been moved outwardly into a location adjacent the ends of the plate 50'. The positioning of the openings 56 is such that one of the flat sides 64 of each of the bolt heads 62 is positioned against the respective walls 30 of the channel 28 to prevent turning of the bolts during tightening.

Although it is believed that the manner of assembling the running board constructions as previously described would be evident to one skilled in the art after considering the foregoing description, one preferred manner of assembly of the construction will be briefly described as follows.

The bolts 60 are first inserted through the openings 56 in the plate 50 or 50' such that the bolts extend downwardly from the plate and the heads of the bolts are positioned in the channel formed by the U-shaped plate. The plate 50 or 50' which is of a length which is substantially greater than the transverse dimension of the bolts 60 as shown in FIGS. 3 and 5, is then inserted into the channel 28 formed by the walls 30 and lips 32 such that the lips 32 support the plate for longitudinal sliding movement of the plate along the length of the deck 12 in the channel 28.

The deck is next installed on the stone guard 74 and the end cap 72 is fixed to the other end of the deck using screws 70.

The mounting bracket 34 is then attached to the frame 48 of the vehicle V by way of the vertical frame mounting arms 44 and bolts 46. The elongate frame arm 36 is then positioned such that the openings 65 in the upper flange 38 of the frame arm are positioned transversely beneath the channel 28 and within the space between the channel lips 32.

The plate 50 or 50' is then slid in the channel 28 so that the openings 56 in the plate overlie the openings 65 in the frame arm 36 and the bolts are extended through the frame arm openings 65. The nuts 66 are then installed on the bolts 60 and tightened, drawing the plate 50 and 50' downwardly against the channel lips and clamping the channel lips 32 firmly between the upper flange 38 of the frame arm 36 and the bottom side ends of the plate 50 or 50' as shown in FIGS. 3 and 5. During tightening of the nuts 66, the bolts are prevented from turning by engagement of one of the flat sides 64 of their heads 62, either with the raised bead 58 as shown in FIGS. 1-4 or the inside of the walls 30 as shown in FIGS. 5 and 6.

From the foregoing description it will be seen that the running board constructions of the present invention realize a number of advantages over the prior art. In the first instance, the strength of the assembly is greatly improved because a firm, two point mounting is provided by the engagement of the ends of the plate with the lips 32. Support and strength are also enhanced because the walls 30 and lips 32 are preferably positioned near the longitudinal edges of the running board deck, thus spreading the forces on the deck over the width of the deck. Strength is also improved due to the increased area of the plate ends which are supported on the lips 32 in contrast to the small area of contact which occurred where only the underside of the bolt heads, as in the prior art, rested directly on the lips of the channels. In addition, the lips 32 are also firmly clamped between the top side of the frame arm 36 and its upper flange 38 and the substantial area provided by the ends of the plates 50 or 50'. This increased clamping area substantially reduces, if not eliminates completely, any tendency which might otherwise occur to tear the lip in use.

The amount and kinds of material have also been substantially reduced in the running board constructions of the present invention. The single channel of the present invention eliminates the need for additional channels or other flanged appendages, reducing the amount of material needed and the weight and cost of the assembly. In addition, the use of the plate 50 or 50' eliminates the need for a lock washer in association with the nuts 66.

Speed and ease of assembly of the running board construction of the present invention are also improved because the bolts 60 are first pre-positioned on the plate 50 or 50' before the plate is installed in the channel. Thus, the bolts are pre-positioned and follow the location of the plate as it is slid along the length of the channel and, when the plate is positioned in alignment with the frame arm openings 65, the bolts are both simultaneously and automatically positioned. This automatic pre-positioning of the bolts is in contrast to the prior multiple channel constructions in which each of the bolts had to be separately positioned in their respective channels.

Finally, the amount of material and weight is also reduced by provision of the channel plates 50 and 50' which are U-shaped in cross-section and, thus, are reinforced by flanges 52, and in the case of the embodiment shown in FIGS. 1-4, the bead 58. Indeed, the use of such channel shaped material to form the plate 50 or 50' allows usage of the same stock to make both the plate 50 or 50' and the vertical frame mounting arms 44 as shown in FIG. 2. The U-shaped cross-section of this material actually improves the strength of the vertical mounting arms 44 over the prior plain flat strap material which was frequently employed for these arms. Moreover, by utilizing the same stock to form the arms 44 as well as the plate 50 or 50', a substantial reduction in raw material stock inventory is realized.

It will be understood that the embodiments of the present invention which have been described are merely illustrative of a few of the applications of the principles of the present invention. Numerous modifications may be made by those skilled in the art without departing from the true spirit and scope of the invention.

What is claimed is:

1. In a running board construction for mounting on a vehicle including an elongate deck, mounting means for substantially horizontally mounting said deck to the vehicle, said mounting means including at least one elongate bracket means for extending beneath and substantially transverse to the deck, said bracket means also being attachable to the frame of the vehicle, and fastener means for fastening said elongate bracket means to the underside of the deck, wherein the improvement in said fastener means comprises:

a channel mounted on the underside of said deck, said channel including a pair of walls substantially spaced transversely from and parallel to each other on said deck and extending downwardly from the underside of said deck, and a pair of inward turned lips on said walls extending toward each other;

a plate of substantial length in a direction transverse of said deck and extending between said walls transversely of said deck and slidably supported upon said lips, and stud means extending downwardly from said slidable plate for attaching said plate to said bracket means and drawing said plate downwardly against said lips, the length of said plate being substantially greater than the transverse dimension of said stud means.

2. In the running board construction of claim 1, wherein said channel is formed integrally with the underside of said deck.

3. In the running board construction of claim 1, wherein said walls and said lips extend longitudinally over substantially the entire length of said deck.

4. In the running board construction of claim 1, wherein said walls are located nearer the elongate edges of said deck than the center of said deck.

5. In the running board construction of claim 1, wherein said plate comprises channel means which is substantially U-shaped in cross-section.

6. In the running board construction of claim 5, wherein said bracket means extends from beneath said deck and includes frame mounting means extending upwardly therefrom and attached to the extending portion of the bracket means, said frame mounting means being formed of the same stock from which said plate is formed.

7. In the running board construction of claim 1, wherein said stud means comprise at least one bolt having a flat sided head, an opening in said plate through which said bolt extends downwardly, a flat side of said bolt head being positioned against at least one of either said walls or said plate to prevent turning of said bolt.

8. In the running board construction of claim 7, wherein said opening in said plate is adjacent one of said walls, and a flat side of said bolt head is positioned against said wall.

9. In the running board construction of claim 8, wherein said stud means includes a pair of said bolts extending through a pair of openings in said plate, and a flat side of each said bolt head is positioned against the respective walls.

10. In the running board construction of claim 7, wherein said opening in said plate is spaced from the ends of said plate, raised bead means on said plate adjacent said opening, and a flat side of said bolt head is positioned against said raised bead means on said plate.

11. In the running board construction of claim 10, wherein said stud means includes a pair of said bolts extending through a pair of openings in said plate, both of said openings being spaced from the ends of said plate, said raised bead means extending longitudinally of the width of said plate and adjacent said openings, and a flat side of each said bolt head is positioned against said raised bead means on said plate.

12. In the running board construction of claim 1, wherein said lips are clamped between said elongate bracket means and said plate when said bracket means and plate are attached by said stud means.

13. In the running board construction of claim 1, including at least one channel shaped bead formed integrally with and extending along each of said walls.

14. In the running board construction of claim 9, wherein said channel is formed integrally with the underside of said deck and said walls and said lips extend longitudinally over substantially the entire length of said deck, said walls are located nearer the elongate edges of said deck than the center of said deck, said plate comprises channel means which is substantially U-shaped in cross-section, and said lips are clamped between said elongate bracket means and said plate when said bracket means and plate are attached by said stud means.

15. In the running board construction of claim 14, wherein said bracket means extends from beneath said deck and includes frame mounting means extending upwardly therefrom and attached to the extending portion of the bracket means, said frame mounting means being formed of the same stock from which said plate is formed.

16. In the running board construction of claim 15, including at least one channel shaped bead formed integrally with and extending along each of said walls.

17. In the running board construction of claim 11, wherein said channel is formed integrally with the underside of said deck and said walls and said lips extend longitudinally over substantially the entire length of said deck, said walls are located nearer the elongate edges of said deck than the center of said deck, said plate comprises channel means which is substantially U-shaped in cross-section, and said lips are clamped between said elongate bracket means and said plate when said bracket means and plate are attached by said stud means.

18. In the running board construction of claim 17, wherein said bracket means extends from beneath said deck and includes frame mounting means extending upwardly therefrom and attached to the extending portion of the bracket means, said frame mounting means being formed of the same stock from which said plate is formed.

19. In the running board construction of claim 18, including at least one channel shaped bead formed integrally with and extending along each of said walls.

* * * * *

UNITED STATES PATENT AND TRADEMARK OFFICE
CERTIFICATE OF CORRECTION

PATENT NO. : 4,451,063
DATED : May 29, 1984
INVENTOR(S) : Steven A. Snyder

It is certified that error appears in the above-identified patent and that said Letters Patent are hereby corrected as shown below:

In column 4, line 52, delete "width" and insert
--length--.

Signed and Sealed this

Second Day of October 1984

[SEAL]

Attest:

GERALD J. MOSSINGHOFF

Attesting Officer

Commissioner of Patents and Trademarks